United States Patent
Tan et al.

(10) Patent No.: US 6,617,735 B2
(45) Date of Patent: Sep. 9, 2003

(54) VEHICLE AC GENERATOR

(75) Inventors: Yoshiki Tan, Anjo (JP); Nakato Murata, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/984,601

(22) Filed: Oct. 30, 2001

(65) Prior Publication Data

US 2002/0053844 A1 May 9, 2002

(30) Foreign Application Priority Data

Nov. 6, 2000 (JP) .................................... 2000-337843

(51) Int. Cl.⁷ .......................... H02K 5/00; H02K 19/22
(52) U.S. Cl. ........................ 310/91; 310/89; 310/68 D
(58) Field of Search ............................. 310/89, 68 D, 310/91

(56) References Cited

U.S. PATENT DOCUMENTS

| | | | | |
|---|---|---|---|---|
| 4,424,464 A | * | 1/1984 | Ikegami | 310/68 D |
| 4,488,070 A | * | 12/1984 | Iwaki et al. | 310/62 |
| 4,492,885 A | * | 1/1985 | Kitamura et al. | 310/62 |
| 5,093,591 A | * | 3/1992 | Kitamura et al. | 310/62 |
| 5,095,235 A | * | 3/1992 | Kitamura | 310/68 D |
| 5,235,229 A | * | 8/1993 | Tanaka et al. | 310/62 |
| 5,250,864 A | * | 10/1993 | Kusumoto et al. | 310/58 |
| 5,424,594 A | * | 6/1995 | Saito et al. | 310/68 D |
| 5,574,324 A | * | 11/1996 | Hirama et al. | 310/194 |
| 5,729,063 A | * | 3/1998 | Adachi et al. | 310/68 D |
| 5,760,513 A | * | 6/1998 | Morishita et al. | 310/91 |
| 5,949,166 A | * | 9/1999 | Ooiwa et al. | 310/68 D |
| 5,998,903 A | * | 12/1999 | Umeda et al. | 310/179 |
| 6,100,613 A | * | 8/2000 | Tanaka et al. | 310/68 D |
| 6,114,783 A | * | 9/2000 | Asao | 310/58 |
| 6,121,699 A | * | 9/2000 | Kashihara et al. | 310/68 D |
| 6,150,196 A | * | 11/2000 | Tanaka et al. | 438/122 |
| 6,184,600 B1 | * | 2/2001 | Asao et al. | 310/64 |
| 6,198,188 B1 | * | 3/2001 | Ihata | 310/68 D |
| 6,285,100 B1 | * | 9/2001 | Pflueger et al. | 310/68 D |
| 6,307,289 B1 | * | 10/2001 | Skala | 310/68 D |
| 6,359,352 B2 | * | 3/2002 | Asao | 310/68 D |
| 2002/0033646 A1 | * | 3/2002 | Tanaka et al. | 310/71 |
| 2002/0043885 A1 | * | 4/2002 | Asao et al. | 310/90 |

FOREIGN PATENT DOCUMENTS

JP 62048238 A * 8/1985 ........... H02K/19/22

* cited by examiner

Primary Examiner—Thomas M. Dougherty
Assistant Examiner—H. Elkassabgi
(74) Attorney, Agent, or Firm—Posz & Bethards, PLC

(57) ABSTRACT

A vehicle AC generator includes a rotor, a stator having a stator core and a stator winding, a pair of front and rear frames and electric components including a rectifier unit and other electrical parts disposed rear of the rear frame. The stator winding is connected to the rectifier unit by one of means of welding, soldering and clamping, and the rear frame has a stay having a fixing surface disposed rear of the electric components. Therefore, it is not necessary to provide a space for screwing a screw bolt to connect the stator winding and the rectifier unit. Because cooling air is discharged from a discharge window along the stay, heated air will not return to any of air intake window.

5 Claims, 6 Drawing Sheets

VEHICLE AC GENERATOR

CROSS REFERENCE TO RELATED APPLICATION

The present application is based on and claims priority from Japanese Patent Application 2000-337843, filed Nov. 6, 2000, the contents of which are incorporated herein by reference.

BACKGROUND OF THE INVENTION

1. Field of the Invention

The present invention relates to a vehicle AC generator for a passenger car, a truck or some other vehicles.

2. Description of the Related Art

Recently, the engine compartment has become narrower and narrower, and there is a limited space for a vehicle AC generator. In addition, such a vehicle AC generator is subjected to severer engine heat.

A conventional vehicle AC generator employs a screw bolt for connecting a stator winding and a rectifier unit. The screw bolt is fastened by a fastening tool at a portion perpendicular to the axis of the AC generator. Therefore, it is necessary, but difficult, to provide a space for accommodating such a tool.

SUMMARY OF THE INVENTION

Therefore, a main object of the invention is to provide an improved vehicle AC generator which can provide a tool space for the screw bolt in spite of a limited mounting space of the AC generator.

Another object of the invention is to provide a vehicle AC generator that provides efficient cooling performance.

According to a feature of the invention, a stator winding is connected to a rectifier unit by one of means of welding, soldering and clamping, and a rear frame has a stay having a fixing surface disposed at the rear of said electric components. Therefore, it is not necessary to provide a space for screwing a screw bolt to connect the rectifier unit and the stator winding.

According to another feature of the invention, the stay has forking link portions, the rear frames has an air discharge window between the link portions, and the rotor has a cooling fan disposed at a rear end thereof. Therefore, cooling air is discharged from the discharge window and guided by the stay, and the discharged cooling air will not return to any of air intake windows, so that efficient cooling can be provided.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A vehicle AC generator according to a first embodiment of the invention is described with reference to FIGS. 1–6.

Figure 1:
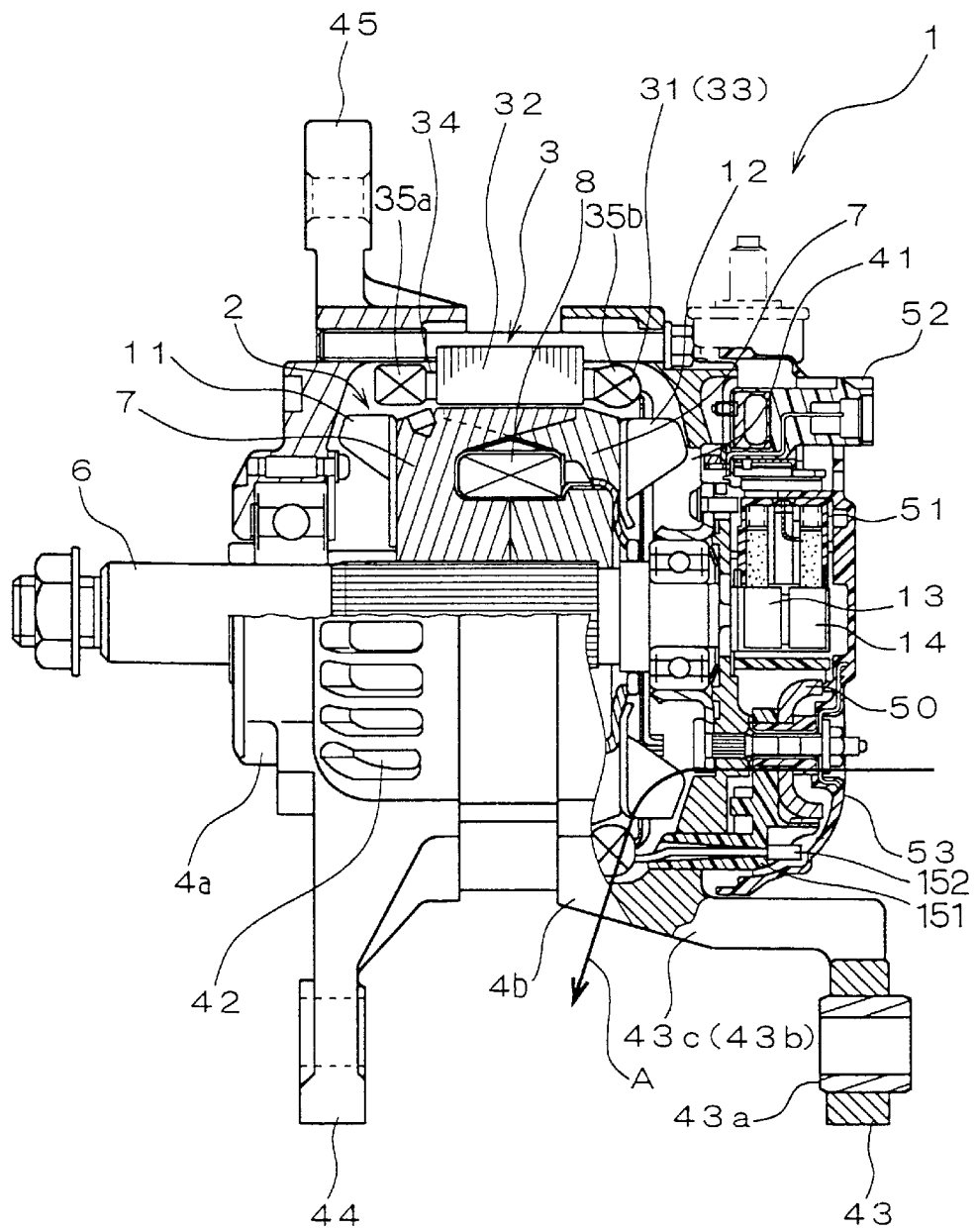
FIG. 1 is a cross-sectional view illustrating a whole structure of a vehicle AC generator according to a first embodiment of the invention.
Figure 2:
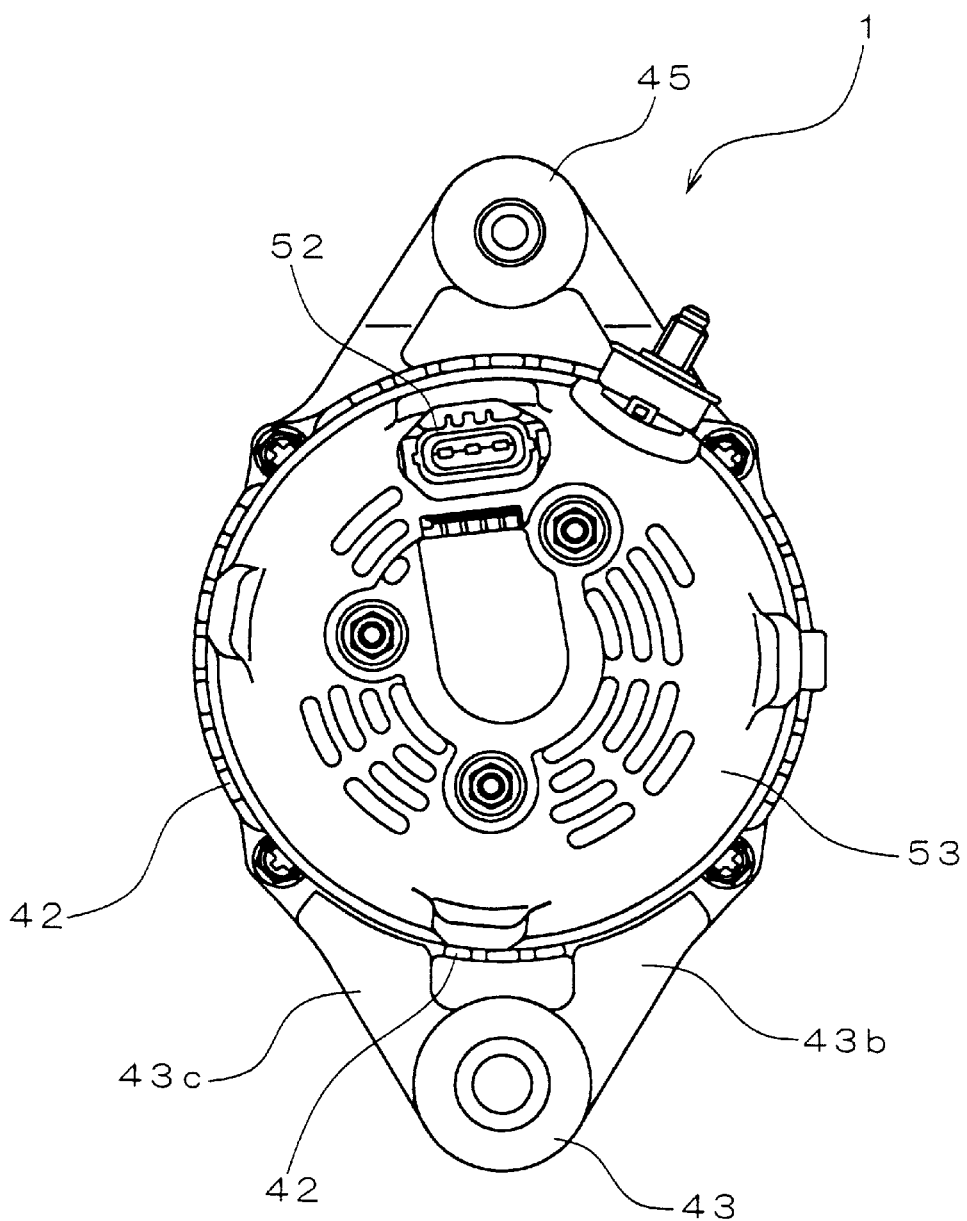
FIG. 2 is a rear view of the vehicle AC generator according to the first embodiment.

As shown in FIG. 1 and FIG. 2, the vehicle AC generator 1 is comprised of a rotor 2, a stator 3, a pair of front and rear frames 4a and 4b, a rectifier unit 50, a brush unit 51, a voltage regulator 52, a rear cover 53, etc.

The rotor 2 is comprised of an insulated cylindrically wound field coil 8, a pole core 7 having a plurality of claw poles that encloses the field coil 8 and a shaft 6 that penetrates the pole core 7 and the field coil 8. A mixe-flow flow type cooling fan 11 is welded to the front end of the pole core 7, and a centrifugal cooling fan 12 is welded to the rear end of the pole core 7. A pair of slip rings 13 and 14 is disposed at a rear portion of the shaft and is connected to the field coil 8. Electric current is supplied to the field coil 8 from the brush unit 51 via the pair of slip rings 13 and 14.

The stator 3 is comprised of a stator core 32, a stator winding 31 that is formed from a plurality of conductor segments 33, and insulators 34 for insulating the conductor segments 33 from the stator core 32. The stator core 32 is a laminate of thin iron sheets and has a plurality of slots at the inner surface thereof. The insulators 34 are disposed on the inner wall of the slots.

The stator winding 31 is comprised of a plurality of conductor segments 33 connected to each other according to a prescribed rule.

Figure 3:
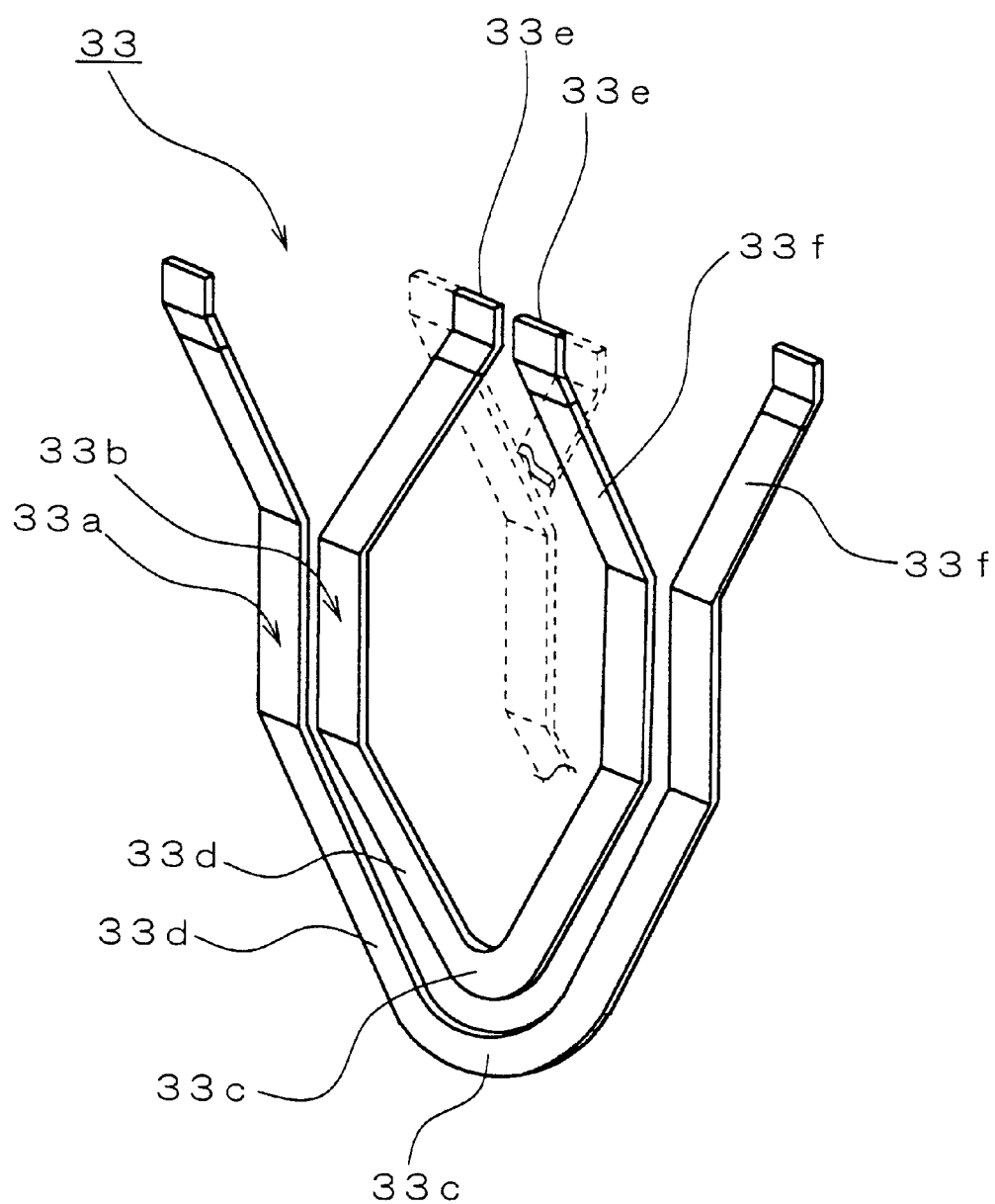
FIG. 3 is a perspective view illustrating a pair of conductor segments forming a stator winding of the AC generator according to the first embodiment.

In FIG. 3, a pair of conductor segments 33a and 33b is a base unit for forming the stator winding 31. Each of the U-shaped conductor segments 33 has a turn portion 33c and segment ends 33e. The turn portion 33c forms a drive-side or pulley-side coil end 35 together with adjoining inclined portions 33d. The segment ends 33e are welded by means of TIG (tungsten inert-gas) welding.

Figure 4:
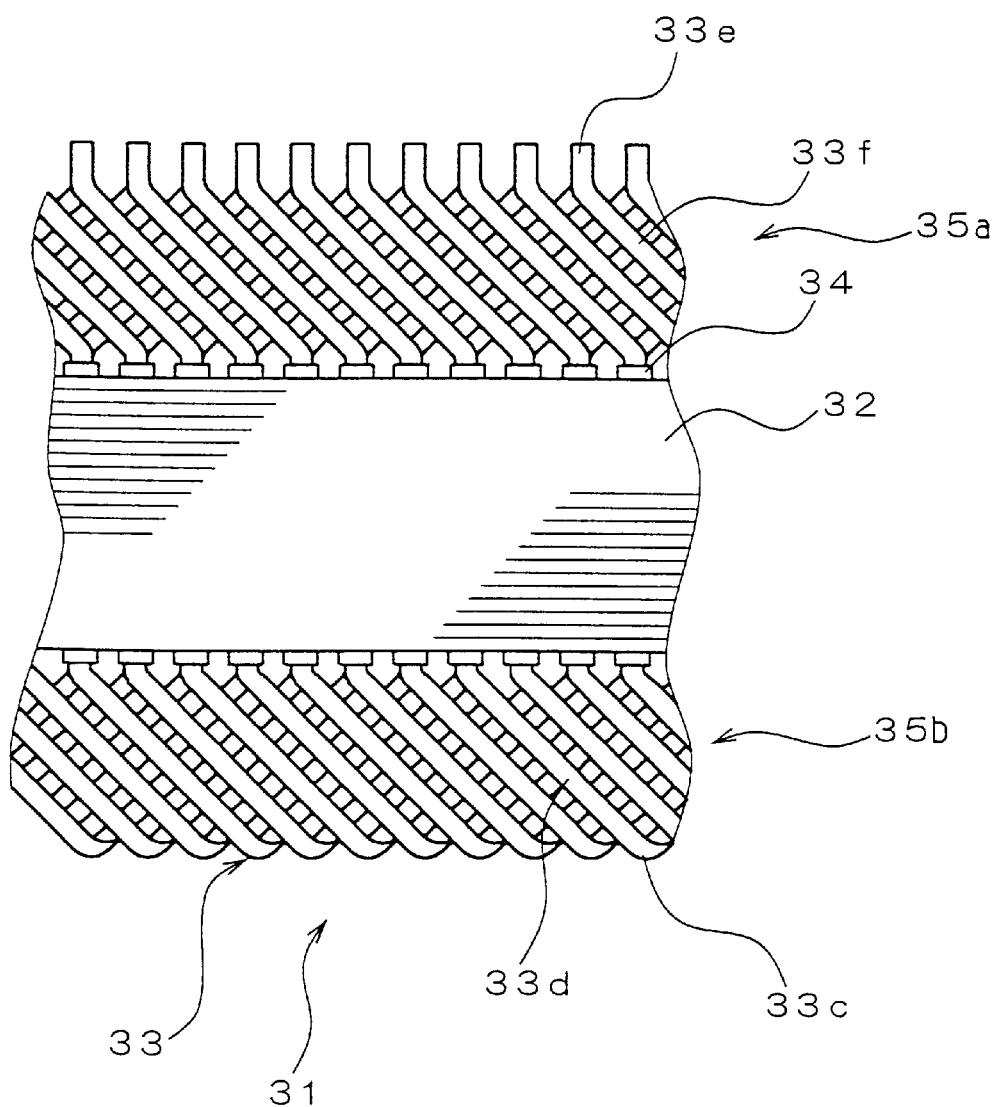
FIG. 4 is a fragmentary side view of the stator of the vehicle AC generator according to the first embodiment.

As shown in FIG. 4, each of the conductor segments 33 has a turn portion 33c disposed at an axial end of the stator core 32 and segments ends 33e disposed at the other end of the stator core 32. Coil ends 35a are formed from the inclined portions 33f that are uniformly disposed both in an inner layer and an outer layer. Those of the inclined portions 33f disposed in the inner layer and those of the inclined portions 33f disposed in the outer layer extend in directions opposite to each other. Coil ends 35b are also formed from inclined portions 33d that are disposed both in the inner layer and the outer layer. Those of inclined portion 33d disposed in the inner layer and those of the inclined portion 33d disposed in the outer layer extend in directions opposite to each other. The pair of front and rear frames 4a and 4b sandwiches the stator 3 so that the rotor 2 can be accommodated inside the stator 3. The rotor 2 is supported so that it can rotate with the shaft 6. Each of the pair of frames 4a and 4b has air discharge windows 42 at portions around the coil ends 35a or 35b and air intake windows 41 at the axial end thereof.

The front frame 4a has a front fixing stay 44 and an adjusting stay 45, and the rear frame 4b has a rear fixing stay 43. The AC generator 1 is fixed to a bracket of an engine (not shown) by the front fixing stay 44 and the rear fixing stay 43.

The rear fixing stay 43 has a fixing surface 43a that is to be in contact with the bracket of an engine and located at the rear of the rectifier unit 50 and other electric components. The rear fixing stay 43 also has a pair of forking link portions 43b and 43c that is integrated with the rear frame 4b. One of the air discharging windows 42 is opened at portion of the rear frame 4b between the pair of link portions 43b and 43c.

The rectifier unit 50 rectifies three-phase output power of the stator winding 31 and provides DC power. The stator winding 31 and the rectifier unit 50 are connected by means of welding, soldering or clamping.

Figure 5:
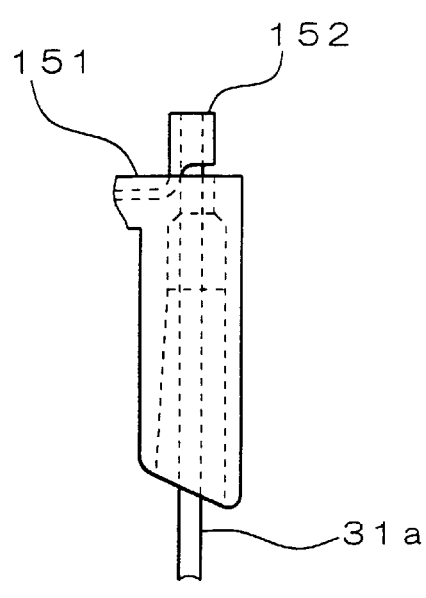
FIG. 5 is a fragmentary side view illustrating a connection portion of an output line of the stator winding and a rectifier unit.
Figure 6:
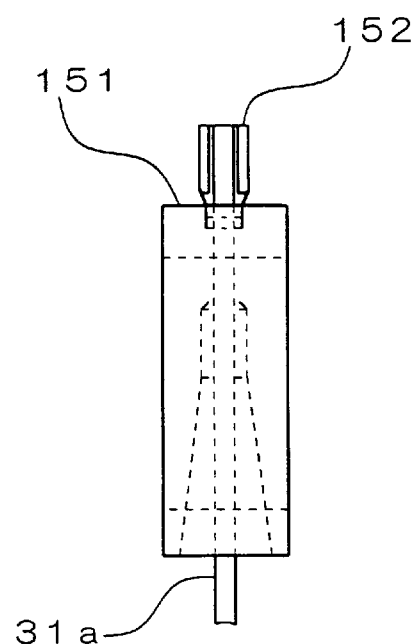
FIG. 6 is a fragmentary front view illustrating a connection portion of an output line of the stator winding and a rectifier unit.

As shown in FIGS. 1, 5 and 6, an output line 31a of the stator winding 31 is extended from a terminal unit 151 of the rectifier unit 50 and soldered to a terminal 152. The output line 31a can be connected to the terminal 152 by another means, such as welding or clamping, except a screw bolt. The rear cover 53 is fixed to the rear frame 4b so as to cover the brush unit 51 and the voltage regulator 52.

The above-described vehicle AC generator 1 is driven by an engine via a pulley (not shown). When field current is supplied to the field coil 8, the claw poles of the pole core 7 are excited, and three-phase AC voltage is generated in the stator winding 31 so that DC power can be provided at an output terminal of the rectifier unit 50.

Thus, there is no need to use a screw bolt to connect the output line 31a of the stator 3 and the rectifier unit 50. In other words, there is no need to provide any space for screwing a screw bolt. Therefore, the fixing surface 43a of the rear fixing stay 43 can be located at the rear of the rectifier unit 50 and other electrical components. Since the fixing surface 43a is located at the rear of the rectifier unit 50 and other components, one of the air discharging windows 42 can be located at a portion around the rear coil ends. As a result, the discharging air is guided by the link portions 43b and 43c and the fixing surface 43a and will not return near any of the air intake windows 41, so that the rectifier unit 50 and other electrical components can be cooled effectively.

Figure 7:
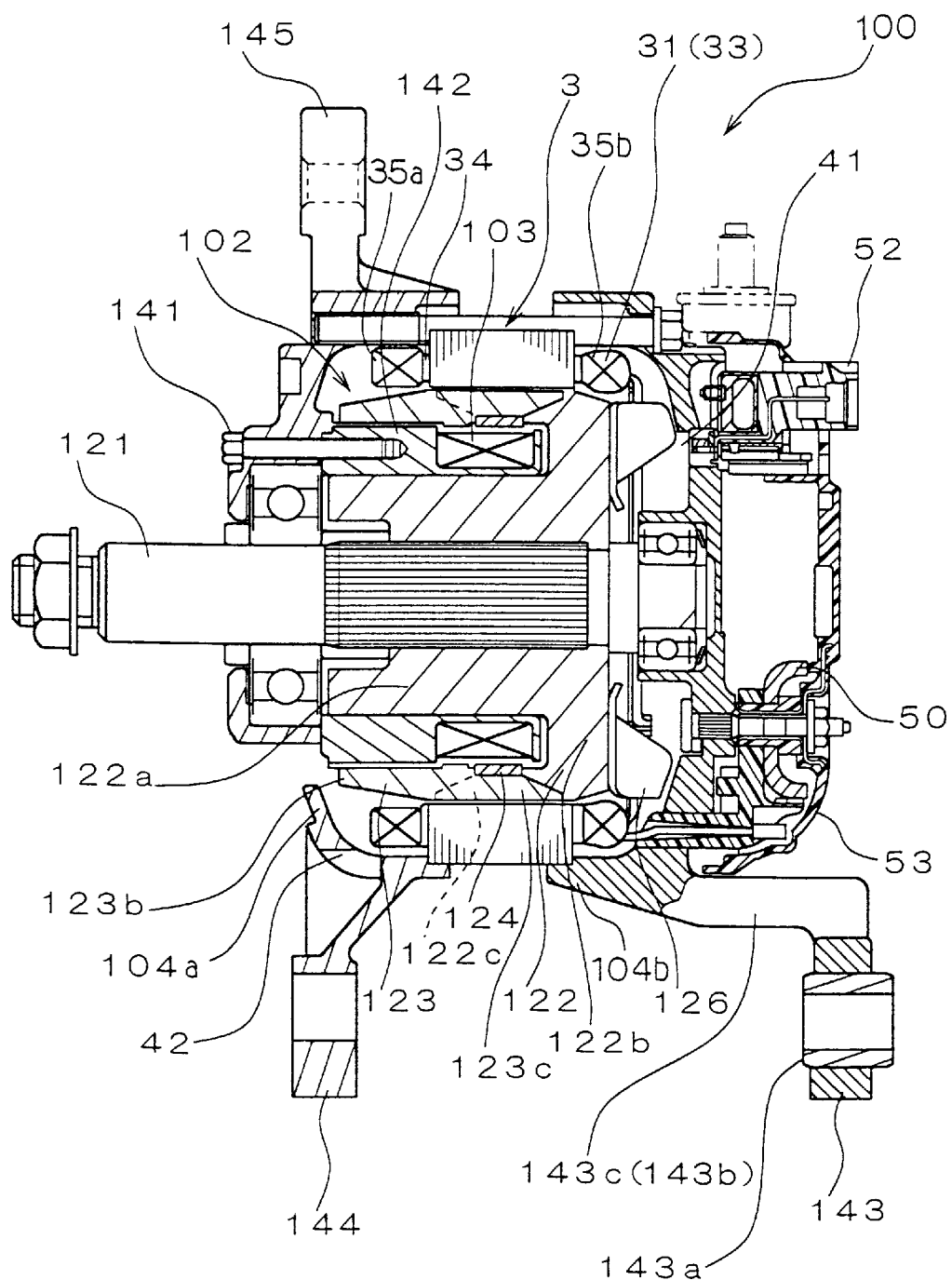
FIG. 7 is a cross-sectional view illustrating a whole structure of a vehicle AC generator according to a second embodiment of the invention.

A vehicle AC generator 100 according to a second embodiment of the invention is described with reference to FIG. 7. In the meanwhile, the same reference numeral represents the same or substantially the same part, portion or component, hereafter.

The AC generator 100 is comprised of a rotor 102, a field coil 103, a stator 3, a pair of front and rear frames 104a and 104b, a rectifier unit 50, a voltage regulator 52, a rear cover 53, etc.

The rotor 102 is comprised of a shaft 121, a rear pole core 122, a crown-cap-shape front pole core 123, non-magnetic ring 124 that joints the rear and front pole cores 122 and 123, a cooling fan 126 welded to the rear end of the rear pole section 122, etc. The cooling fan 126 is comprised of a centrifugal fan blades and mixed-flow fan blades, which are alternately disposed in the circumferential direction.

The rear pole core 122 is comprised of a boss portion 122a to which the shaft 121 is press-fitted, a disk portion 122b that extends radially outward from the boss portion 122a and a plurality of claw poles 122c that extends forward in the axial direction from the fringe of the disk portion 122b. The front pole core 123 is comprised of a ring portion 123b and a plurality of claw poles 123c that extends rearward from the ring portion 123b.

The claw poles 122c of the rear pole core 122c and the claw poles 123c of the front pole core 123 are alternately disposed in the circumferential direction and fixed to each other by the non-magnetic ring 124.

The field coil 103 is fixed to the pair of front and rear frames 104a and 104b by a through bolt 141 and mounted in a portion of a field core 142.

The pair of front and rear frames 104a and 104b sandwiches the stator 3 so that the rotor 102 can be accommodated inside the stator 3. The rotor 102 is supported so that it can rotate with the shaft 121. Each of the pair of frames 104a and 104b has air discharge windows 42 at portions around the stator winding 31 and air intake windows 41 at the axial end thereof.

The front frame 104a has a front fixing stay 144 and an adjusting stay 145, and the rear frame 104b has a rear fixing stay 143. The AC generator 100 is fixed to a bracket of an engine (not shown) by the front fixing stay 144 and the rear fixing stay 143.

The rear fixing stay 143 has a fixing surface 143a that is to be in contact with the bracket of an engine and located at the rear of the rectifier unit 50 and other electric components. The rear fixing stay 143 also has a pair of forking link portions 143b and 143c that is integrated with the rear frame 104b. One of the air discharging windows 42 is opened at portion of the rear frame 104b between the pair of forking link portions 143b and 143c.

The above-described vehicle AC generator 100 is driven by an engine via a pulley (not shown). When field current is supplied to the field coil 103, the claw poles 122c and 123c of the pole cores 122 and 123 are excited, and three-phase AC voltage is generated in the stator winding 31 so that DC power can be provided at an output terminal of the rectifier unit 50. The stator winding 31 and the rectifier unit 50 are connected by means of welding, soldering or clamping.

Thus, there is no need to use a screw bolt to connect the output line of the stator 3 and the rectifier unit 50, and there is no need to provide any space for screwing a screw bolt. Therefore, the fixing surface 143a of the rear fixing stay 43 can be located at the rear of the rectifier unit 50 and other electrical components. Since the fixing surface 143a is located at the rear of the rectifier unit 50 and other components, one of the air discharging windows 42 can be located at a portion around the rear coil ends 35b. Therefore, the discharging air is guided by the link portions 43b and 43c and the fixing surface 43a and will not come near any of the air intake windows, so that the rectifier unit 50 and other electrical components can be cooled effectively.

Figure 8:
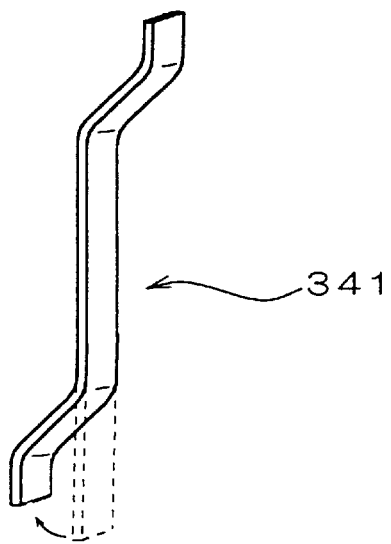
FIG. 8 is a perspective view illustrating a variation of the conductor segment.

The conductor segments 33 of the above-described embodiments can be substituted by conductor segments 341 shown in FIG. 8.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A vehicle AC generator comprising:

a rotor having a cooling fan at a rear end thereof;

a stator having a stator core and a stator winding;

a pair of front and rear frames for supporting said rotor and said stator;

electrical components including a rectifier unit connected to said stator winding disposed at the rear of said rear frame; and a rear cover for covering said electrical components, said rear cover having at least one air intake window disposed at a rear of said electrical components;

wherein said rear frame comprises a cylindrical outer wall and a fixing stay having forking link portions extending from said outer in front of said electrical components to a portion around said rear cover at the rear of said electrical components, said outer wall having an air discharging window disposed between said forking link portions of said fixing stay, and said fixing stay comprises a surface at a portion around said air discharging window for guiding air discharged from said air discharging window radially outside said rear cover.

2. The vehicle AC generator as claimed in claim 1, wherein said stator winding comprises a plurality of conductor segments connected to each other at connection portions spaced apart from each other in a circumferential direction.

3. The vehicle AC generator as claimed in claim 1, wherein said field coil is fixed to said pair of front and rear frames, and said rotor has a plurality of centrifugal fan blades and a plurality of mixed-flow-type fan blades at the rear end thereof.

4. The vehicle AC generator as claimed in claim 1, wherein said portion of said outer wall in front of said electrical components is disposed completely in front of said electric components.

5. The vehicle AC generator as claimed in claim 1, wherein said fixing stay having forking link portion comprises a first end disposed in front of said electrical components and a second end providing said fixing surface disposed at the rear of said electrical components.

* * * * *